US012280487B2

(12) United States Patent
Jungklaus et al.

(10) Patent No.: US 12,280,487 B2
(45) Date of Patent: Apr. 22, 2025

(54) HANDLE ASSEMBLY FOR A FINISHER BOX

(71) Applicant: AMES TOOLS CORPORATION, Suwanee, GA (US)

(72) Inventors: Matthew W. Jungklaus, Lawrenceville, GA (US); Timothy J. Beran, Dacula, GA (US)

(73) Assignee: AMES TOOLS CORPORATION, Suwanee, GA (US)

( * ) Notice: Subject to any disclaimer, the term of this patent is extended or adjusted under 35 U.S.C. 154(b) by 504 days.

(21) Appl. No.: 17/627,529

(22) PCT Filed: Aug. 5, 2020

(86) PCT No.: PCT/US2020/044989

§ 371 (c)(1),
(2) Date: Jan. 14, 2022

(87) PCT Pub. No.: WO2021/026221

PCT Pub. Date: Feb. 11, 2021

(65) Prior Publication Data

US 2022/0266442 A1 Aug. 25, 2022

Related U.S. Application Data

(60) Provisional application No. 62/882,996, filed on Aug. 5, 2019.

(51) Int. Cl.

| | |
|---|---|
| ***B25G 1/04*** | (2006.01) |
| ***B05C 17/005*** | (2006.01) |
| ***E04F 21/165*** | (2006.01) |

(52) U.S. Cl.

CPC .......... *B25G 1/04* (2013.01); *B05C 17/00589* (2013.01); *E04F 21/165* (2013.01)

(58) Field of Classification Search

CPC .... E04F 21/265; B05C 17/00589; B25G 1/04
See application file for complete search history.

(56) References Cited

U.S. PATENT DOCUMENTS 5,062,731 A 11/1991 MacMillan
5,088,147 A * 2/1992 MacMillan ............. E04F 21/06 15/235.4

(Continued)

FOREIGN PATENT DOCUMENTS

EP 0441455 A1 8/1991

OTHER PUBLICATIONS

International Search Report and Written Opinion for Application No. PCT/US20/44989 dated Jan. 14, 2021 (19 pages).

(Continued)

*Primary Examiner* — Jason W San
*Assistant Examiner* — Matthew J Sullivan
(74) *Attorney, Agent, or Firm* — Michael Best & Friedrich LLP

(57) ABSTRACT

A handle assembly for a finisher box including a first tube including a first end and a second end opposite the first end. The first tube defines a longitudinal axis extending between the first and second ends. The handle assembly includes a second tube disposed within the first tube. The second tube is movable relative to the first tube along the longitudinal axis. The first tube includes a first end and a second end opposite the first end. The handle assembly includes a connecting plate pivotably supported by the second end of the second tube. The connecting plate is configured to be coupled to the finisher box to support the finisher box from the handle assembly. The handle assembly includes a brake assembly with a brake handle coupled to the first end of the first tube. The brake assembly is configured to selectively inhibit pivoting movement of the connecting plate.

28 Claims, 15 Drawing Sheets

(56) References Cited

U.S. PATENT DOCUMENTS

| | | | | |
|---|---|---|---|---|
| 5,099,539 | A * | 3/1992 | Forester | B25J 1/04 15/144.3 |
| 5,122,006 | A | 6/1992 | MacMillan | |
| 5,143,264 | A | 9/1992 | MacMillan | |
| 5,182,965 | A | 2/1993 | MacMillan | |
| 5,419,693 | A | 5/1995 | MacMillan | |
| 5,423,666 | A | 6/1995 | MacMillan | |
| 5,611,243 | A | 3/1997 | MacMillan | |
| 6,260,238 | B1 * | 7/2001 | MacMillan | E04F 21/06 15/144.3 |
| 6,367,121 | B1 * | 4/2002 | MacMillan | E04F 21/244 16/110.1 |
| 6,412,138 | B1 * | 7/2002 | MacMillan | E04F 21/06 15/235.8 |
| 7,114,869 | B2 | 10/2006 | MacMillan | |
| 7,144,180 | B2 * | 12/2006 | Stahle | F16B 7/10 403/374.1 |
| 7,631,389 | B2 * | 12/2009 | St. James | B25G 1/04 15/144.4 |
| 7,721,377 | B2 * | 5/2010 | Jungklaus | E04F 21/165 15/235.8 |
| 9,133,631 | B2 * | 9/2015 | Jungklaus | B25G 1/10 |
| 9,283,586 | B2 | 3/2016 | MacMillan | |
| 9,403,267 | B2 * | 8/2016 | Ho | F16B 7/105 |
| 9,868,201 | B2 * | 1/2018 | Kamiya | B25F 5/008 |
| 10,052,751 | B2 * | 8/2018 | Sampaio | A47L 13/42 |
| 10,091,948 | B2 * | 10/2018 | Pringnitz | B25G 1/04 |
| 11,698,092 | B2 * | 7/2023 | Buckley | F16B 7/1454 403/109.1 |
| 11,992,928 | B2 * | 5/2024 | Savard | B25G 1/04 |
| 12,005,562 | B2 * | 6/2024 | Lin | F16B 7/105 |
| 2005/0193511 | A1 | 9/2005 | St. James et al. | |
| 2006/0230564 | A1 | 10/2006 | Jungklaus et al. | |
| 2007/0077114 | A1 | 4/2007 | Mondloch et al. | |
| 2011/0095213 | A1 | 4/2011 | Roman | |
| 2011/0097136 | A1 | 4/2011 | Roman | |
| 2011/0297327 | A1 | 12/2011 | Castagnetta et al. | |
| 2015/0089821 | A1 * | 4/2015 | Troudt | B25G 1/04 16/427 |
| 2015/0272100 | A1 * | 10/2015 | Bournique | A01K 87/00 43/25 |
| 2019/0059345 | A1 * | 2/2019 | Flinsky | A01K 87/08 |
| 2022/0266442 | A1 * | 8/2022 | Jungklaus | B25G 1/04 |
| 2023/0265665 | A1 * | 8/2023 | Gill | B05B 9/0866 118/300 |

OTHER PUBLICATIONS

International Preliminary Report on Patentability for Application No. PCT/US20/44989 dated Feb. 8, 2022 (11 pages).

TapeTech Tool Co., “Xtender™ Handle Operation and Maintenance Guide Model: 88TTE”, 2012, 3 pages.

European Patent Office Extended Search Report for Application No. 20849505.1 date Mar. 28, 2024 (7 pages).

Canadian Patent Office Action for Application No. 3147726 dated Apr. 11, 2024 (7 pages).

* cited by examiner

HANDLE ASSEMBLY FOR A FINISHER BOX

CROSS REFERENCE TO RELATED APPLICATIONS

This application claims priority to U.S. Provisional Patent Application No. 62/882,996 filed Aug. 5, 2019, the entire contents of which are incorporated by reference herein.

FIELD OF THE INVENTION

The present invention relates to an extendable handle assembly and, more particularly, to an extendable handle assembly for a finisher box.

BACKGROUND OF THE INVENTION

Finisher boxes are used to apply drywall joint compound (or other materials) over wall seams or other joints to seal and finish them. Currently, these materials are extruded from finisher boxes by pivoting movement of a push plate on the finisher box. Typically, a short, fixed-length handle is fastened to the push plate to assist a user in extruding material from the finisher box. It is convenient to have an extendable handle to extrude material from the finisher box at otherwise hard to reach locations.

SUMMARY OF THE INVENTION

The invention provides, in one aspect, a handle assembly for a finisher box. The handle assembly includes a first tube including a first end and a second end opposite the first end. The first tube defines a longitudinal axis extending between the first and second ends. The handle assembly also includes a second tube disposed within the first tube. The second tube is movable relative to the first tube along the longitudinal axis. The first tube includes a first end and a second end opposite the first end. The handle assembly further includes a connecting plate pivotably supported by the second end of the second tube. The connecting plate is configured to be coupled to the finisher box to support the finisher box from the handle assembly. The handle assembly further includes a brake assembly with a brake handle coupled to the first end of the first tube. The brake assembly is configured to selectively inhibit pivoting movement of the connecting plate.

The invention provides, in another aspect, a handle assembly for a finisher box, the handle assembly including a first tube with a first end and a second end opposite the first end. The first tube defines a longitudinal axis extending between the first and second ends. The handle assembly also includes a second tube movable relative to the first tube along the longitudinal axis. The second tube includes a first end and a second end opposite the first end. The second tube has a longitudinal slot extending between the first and second ends. The handle assembly further includes a brake assembly with a brake handle coupled to the first end of the first tube, a brake clamp coupled to the second end of the second tube, a pull rod coupled at one end to the brake handle and positioned within the slot of the second tube, and a brake rod. The handle assembly further includes a connecting plate pivotably coupled to the brake clamp. The connecting plate is configured to be coupled to the finisher box to support the finisher box from the handle assembly. The brake rod is operable to apply a clamping force to the brake clamp in response to actuation of the brake handle to inhibit the connecting plate from pivoting.

The invention provides, in another aspect, a handle assembly for a finisher box, the handle assembly including a first tube with a first end and a second end opposite the first end. The first tube defines a longitudinal axis extending between the first and second ends. The handle assembly also includes a second tube movable relative to the first tube along the longitudinal axis. The second tube includes a first end and a second end opposite the first end. The brake assembly further includes a brake assembly including a brake handle coupled to the first end of the first tube, a clamp assembly supported by the first tube, a brake rod having a first end and a second end opposite the first end extending through the clamp assembly, and a pull rod having a first end coupled to the brake handle and a second end opposite the first end coupled to the clamp assembly. The handle assembly further includes a connecting plate pivotably coupled to the second end of the brake rod. The connecting plate is configured to be coupled to the finisher box to support the finisher box from the handle assembly. The clamp assembly is operable to apply a clamping force to the brake rod in response to actuation of the brake handle to inhibit the connecting plate from pivoting.

The invention provides, in yet another aspect, a handle assembly for a finisher box, the handle assembly including a tube having a first end, a second end opposite the first end, and a longitudinal axis extending between the first and second ends. The handle assembly also includes a brake assembly having a brake handle coupled to the first end of the tube, a clamp assembly disposed within an interior of the tube, a brake rod having a first end and a second end opposite the first end extending through the clamp assembly, and a pull rod having a first end coupled to the handle and a second end opposite the first end coupled to the clamp assembly. The handle assembly further includes a connecting plate pivotably coupled to the second end of the brake rod. The connecting plate is configured to be coupled to the finisher box to support the finisher box from the handle assembly. The clamp assembly is operable to apply a clamping force to the brake rod in response to actuation of the brake handle to inhibit the connecting plate from pivoting.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
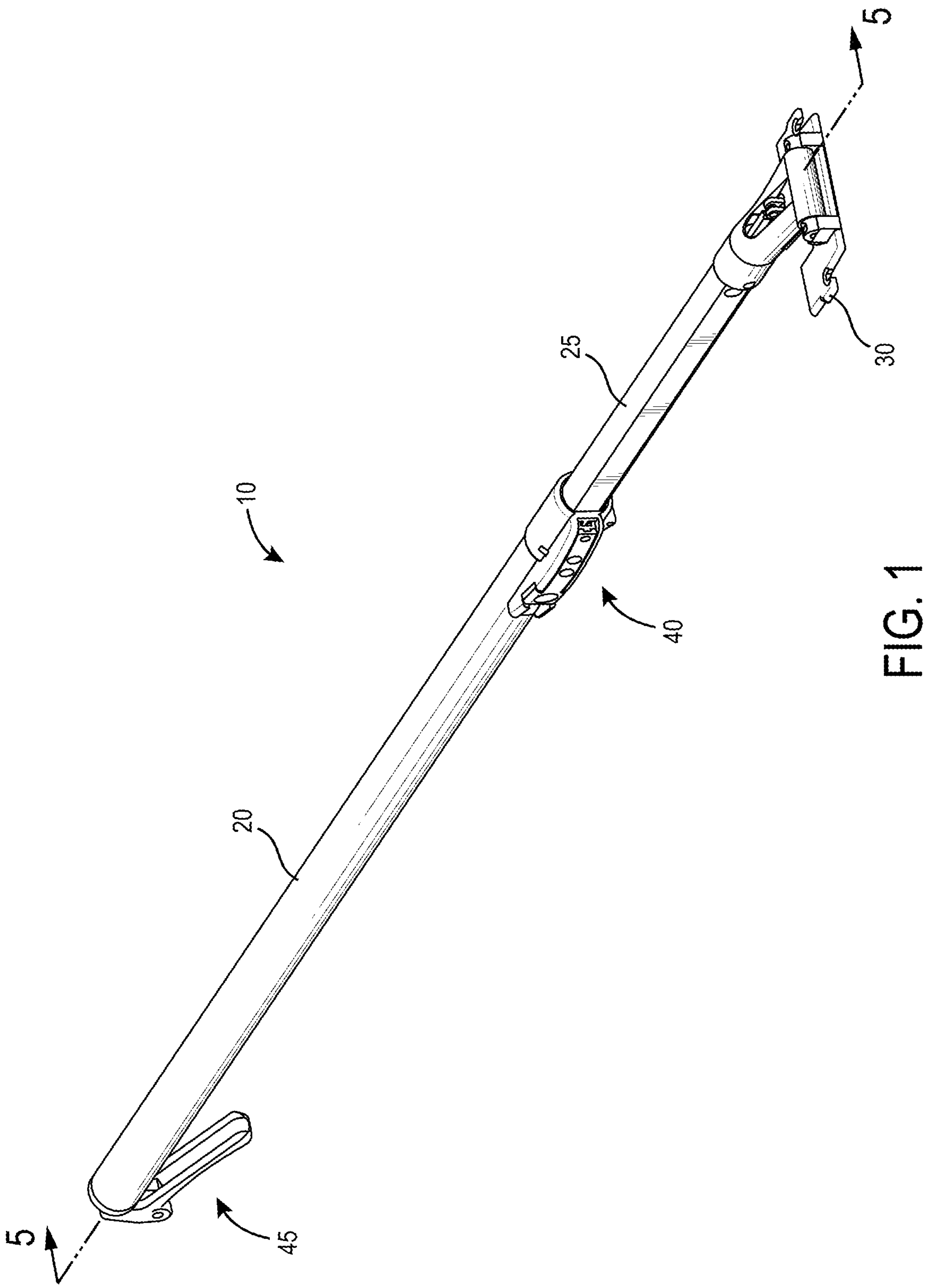
FIG. 1 is a perspective view of a handle assembly according to an embodiment of the invention.
Figure 2:
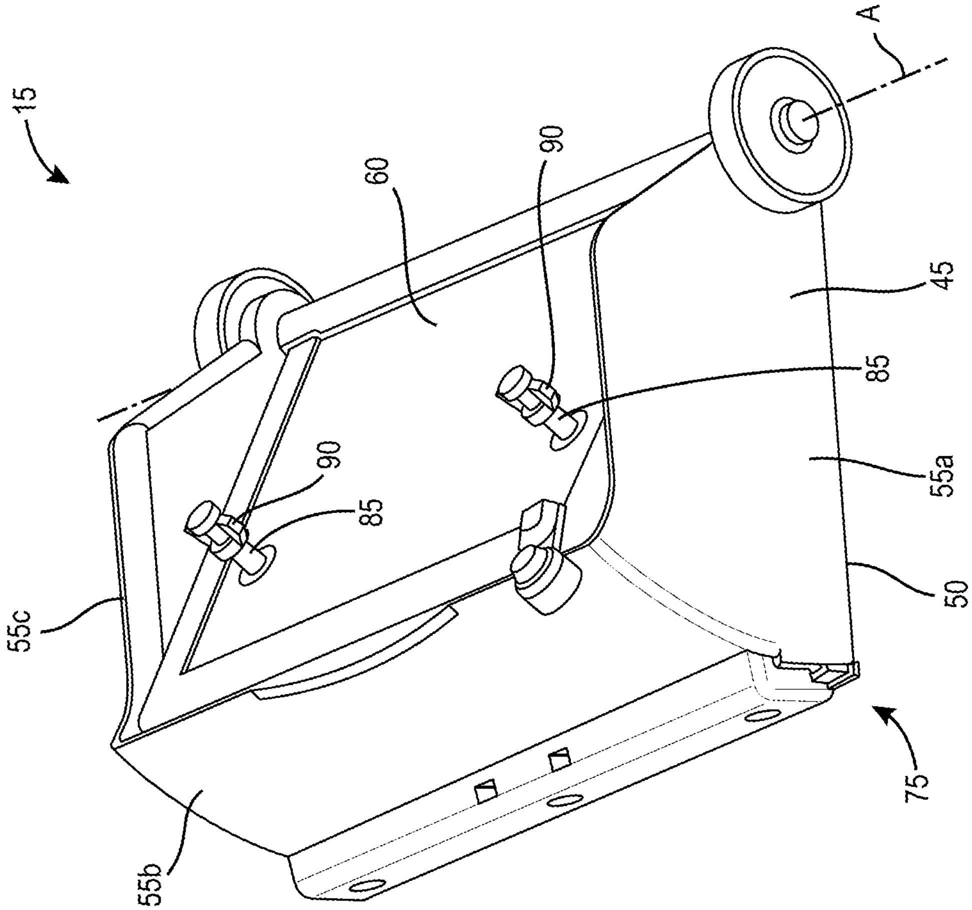
FIG. 2 is perspective view of a finisher box configured to be coupled to the handle assembly of FIG. 1.

FIG. 1 illustrates a handle assembly 10 for use with a finisher box 15 (FIG. 2). In the illustrated embodiment, the handle assembly 10 is an extendable handle assembly, permitting a user to use the finisher box 15 in high and hard to reach locations. In other words, the handle assembly 10 is operable to telescope to a variety of different lengths. The handle assembly 10 includes an outer tube 20, an inner tube 25 received within the outer tube 20, and a connecting plate 30 to which the finisher box 15 can be fastened, thereby unitizing the connecting plate 30 to the finisher box 15.

For the purposes of this application, the finisher box 15 is preferably for drywall finishing on a joint between adjacent pieces of drywall. Drywall finishing is described herein as an example application, but the finisher box 15 may also be used to apply compound to other types of joints or seams that need to be sealed or finished. Alternatively, the finisher box 15 may apply material other than drywall compound to almost any surface, not limited to joints, such as fiber reinforced plastic sheeting or tiling.

With reference to FIG. 2, the finisher box 15 includes a shell or housing 45 with a floor 50 and spaced-apart sides 55*a-c*. The floor 50 defines a footprint of the housing 45 measured by the length and width of the floor 50. The floor 50 and the sides 55*a-c* are adapted to receive joint compound in a cavity (not illustrated) they form. The floor 50 and sides 55*a-c* may be formed as one piece or coupled by any suitable means. The finisher box 15 also includes a pressure plate 60 positioned between the sides 55*a-c*. The pressure plate 60 is retained to and is pivotable within the housing 45 and between the sides 55*a-c* about a pivot axis A.

The finisher box 15 also includes an opening or aperture 75 located between adjacent edges or surfaces of the floor 50 and the side 55*b*. The aperture 75 allows joint compound or a seaming compound to be extruded therethrough from the cavity. As the pressure plate 60 is manually pivoted along the sides 55*a-c* toward the floor 50, seaming compound, for example, is forced out through the aperture 75. The pressure plate 60 also includes two threaded studs 85 extending upward from the pressure plate 60 that are receivable within corresponding notches 95 (FIG. 8) defined in the connecting plate 30 of the handle assembly 10. Fasteners, such as wing nuts 90, are threaded to the studs 85 for clamping the connecting plate 30 to the pressure plate 60.

Figure 3:
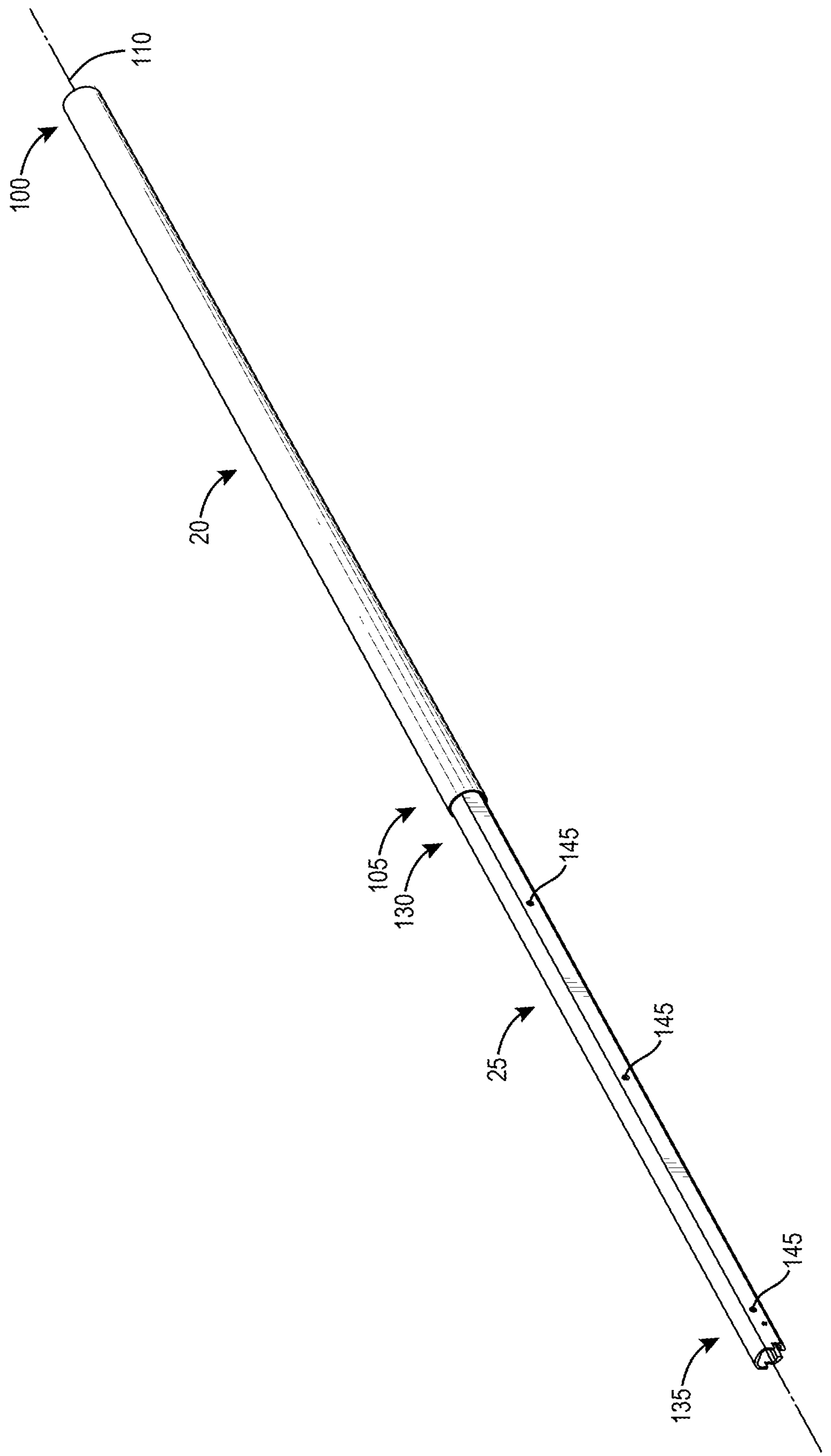
FIG. 3 is a perspective view of an inner and outer tube of the handle assembly of FIG. 1.
Figure 4:
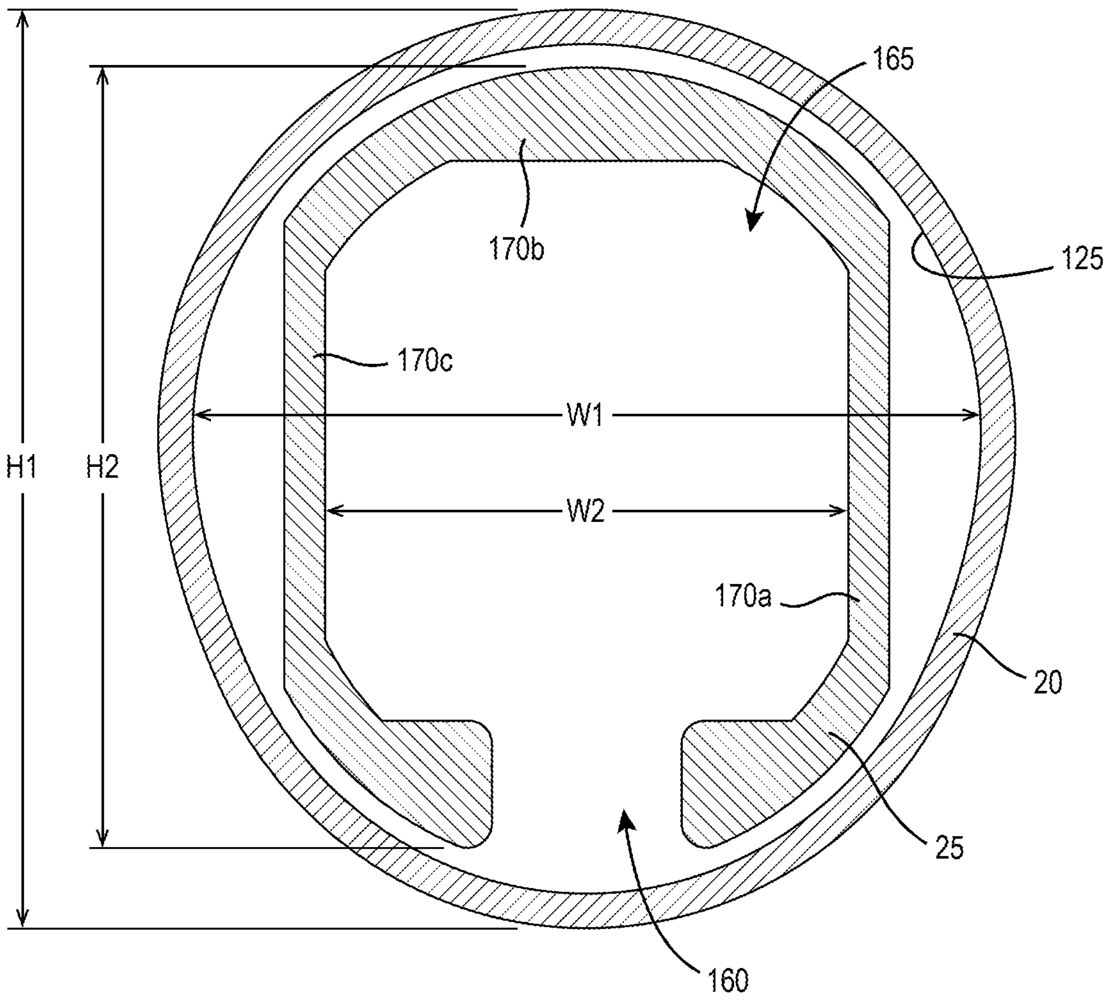
FIG. 4 is a cross-sectional view of the inner and outer tube of FIG. 3.

Referring to FIGS. 3 and 4, the outer tube 20 includes a first end 100, a second end 105 opposite the first end 100, and a longitudinal axis 110 extending centrally between the first and second ends 100, 105. In the illustrated embodiment of the handle assembly 10, the outer tube 20 is a generally oval-shaped, having a height that is greater than its width. In particular, the outer tube 20 has a height H1 that is approximately between 1.25 inches and 1.5 inches and a width W1 that is approximately between 1.125 inches and 1.375 inches. The outer tube 20 further includes a rear bracket 115 (FIG. 6) adjacent the first end 100 that defines an opening 120 that extends into an interior 125 of the outer tube 20.

Figure 9:
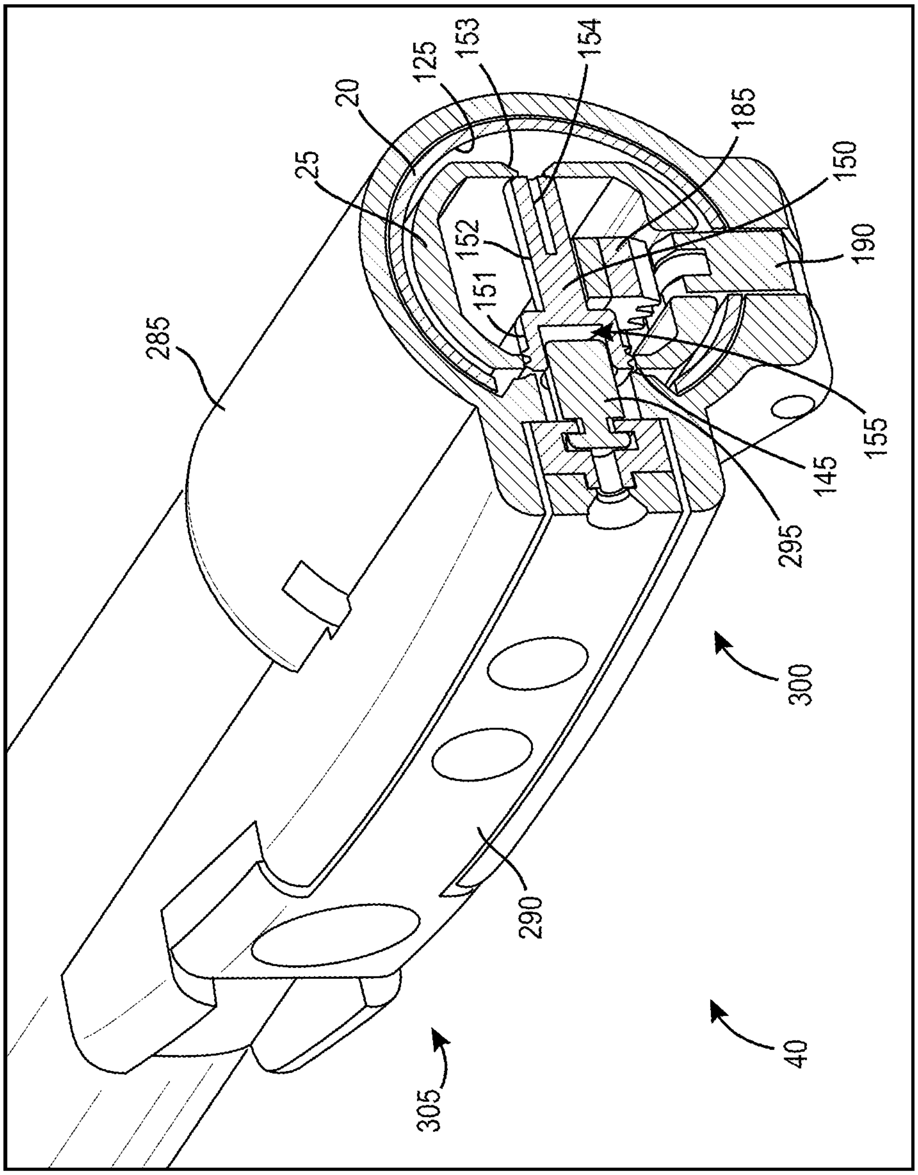
FIG. 9 is a perspective cross-sectional view of the handle assembly of FIG. 8 taken along lines 9-9.

With reference to FIG. 3, the inner tube 25 includes a first end 130, a second end 135 opposite the first end 130, a rear bushing 140 (FIG. 6) adjacent the first end 130, and a plurality of apertures 145 that extend between the first and second ends 130, 135. The rear bushing 140 limits the extent to which the inner tube 25 is retractable within the outer tube 20 when abutted with the rear bracket 115 in the outer tube 20. As shown in FIG. 9, the apertures 145 are threaded to receive an insert 150. The inserts 150 include a head 151 with threads on an outer periphery and a shank 152 extending from the head having a threaded bore 154. The head 151 of the insert 150 defines a recess 155 and is threaded to the threaded apertures 145 with the shank 152 extending into additional apertures 153 of the inner tube 125 opposite the threaded apertures 145. Screws are inserted through the additional apertures 153 and threaded to the threaded bores 154 of the shank 152, thus locking the inserts 150 to the inner tube 25. The insert 150 is made from a strong durable material, such as, stainless steel.

With reference to FIG. 4, the inner tube 25 is positioned within the interior 125 of the outer tube 20. As such, the inner tube 25 has smaller dimensions than the outer tube 20. For example, the inner tube 25 may have an overall height H2 that is approximately between 1.0 inch and 1.25 inches and a width W2 that is approximately between 0.75 inches and 1.0 inch. The inner tube 25 is movable relative to the outer tube 20 along the longitudinal axis 110. The inner tube 25 includes a longitudinal slot 160 that extends between the first and second ends 130, 135. The slot 160 provides access to an interior 165 of the inner tube 25. The interior 165 is further defined by three sides 170*a-c* that form a generally C-shaped profile with curved outer edges that correspond to the shape of the outer tube 20.

As will be explained in more detail below, the apertures 145, and thus the inserts 150, correlate to discrete locations in which the inner tube 25 may be fixed relative to the outer tube 20 (FIG. 3). In the illustrated embodiment, the inner tube 25 includes four apertures 145 corresponding to four discrete fixing locations. In other embodiments, the inner tube 25 may include more than or less than four apertures 145 extending between the first and second ends 130, 135. In some embodiments, the apertures 145 are evenly spaced between the first and second ends 130, 135. In further embodiments, the apertures 145 are intermittently spaced between the first and second ends 130, 135 to fix the inner tube 25 relative to the outer tube 20 in user favorable positions. In the illustrated embodiment, the inner and outer tubes 20, 25 are made from a lightweight metal such as Aluminum. In other embodiments, the inner and outer tubes 20, 25 may be made from other materials or metals.

Figure 5:
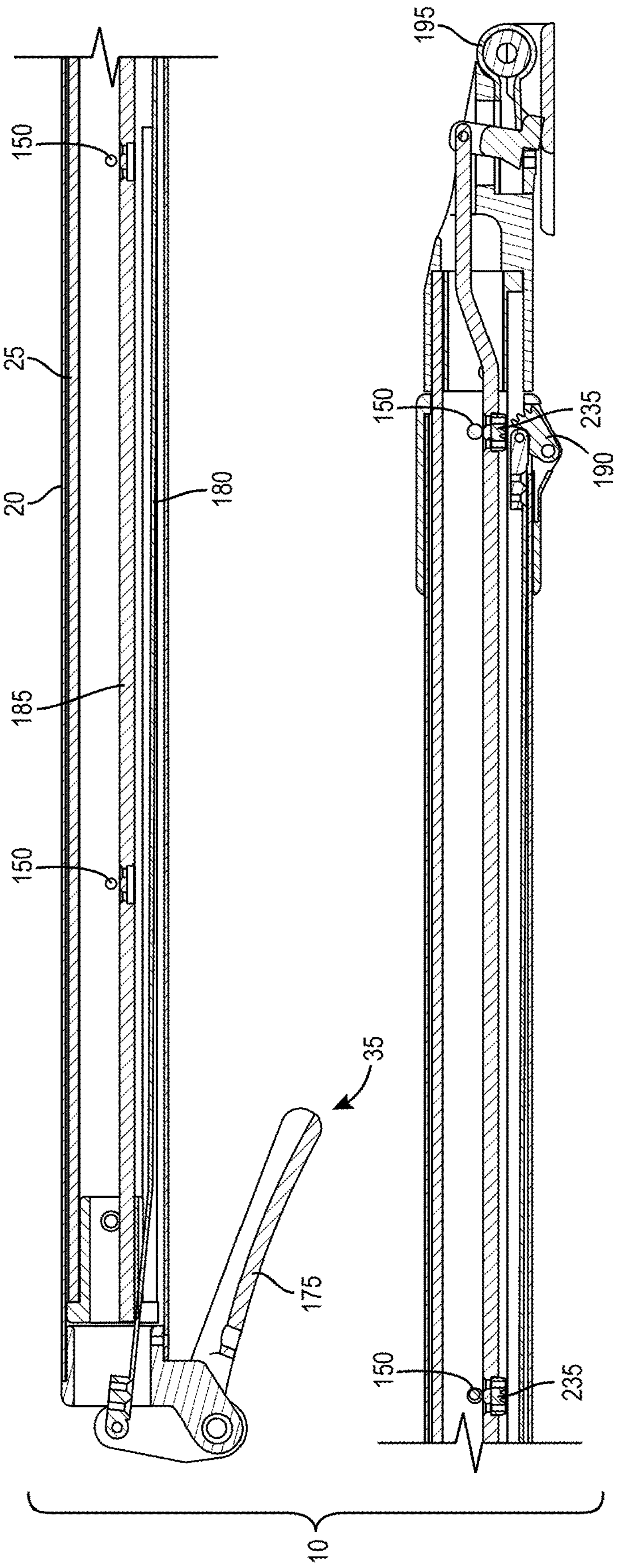
FIG. 5 is a cross-sectional view of the handle assembly of FIG. 1 taken along section 5-5.
Figure 6:
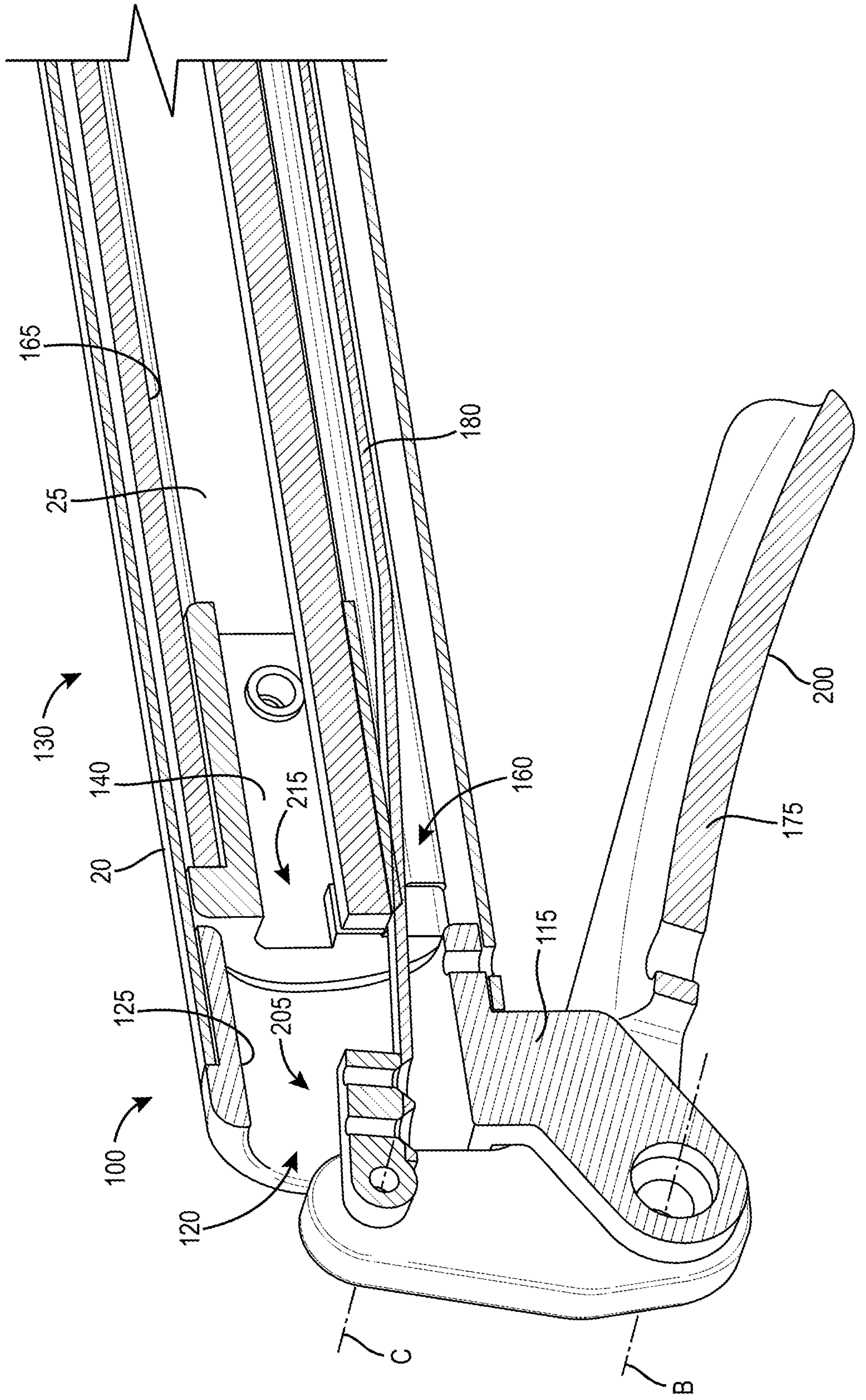
FIG. 6 is an enlarged cross-sectional view of a rear end of the handle assembly of FIG. 5.

With reference to FIG. 5, the handle assembly 10 includes a brake assembly 35 having a brake handle 175, a pull rod 180, a brake rod 185, a pawl 190, and a brake clamp 195. As shown in FIG. 6, the brake handle 175 is pivotably coupled to the rear bracket 115 about a pivot axis B. The brake handle 175 includes a grip 200 that a user may use to pivot the brake handle 175 towards the outer tube 20. The pull rod

Figure 7:
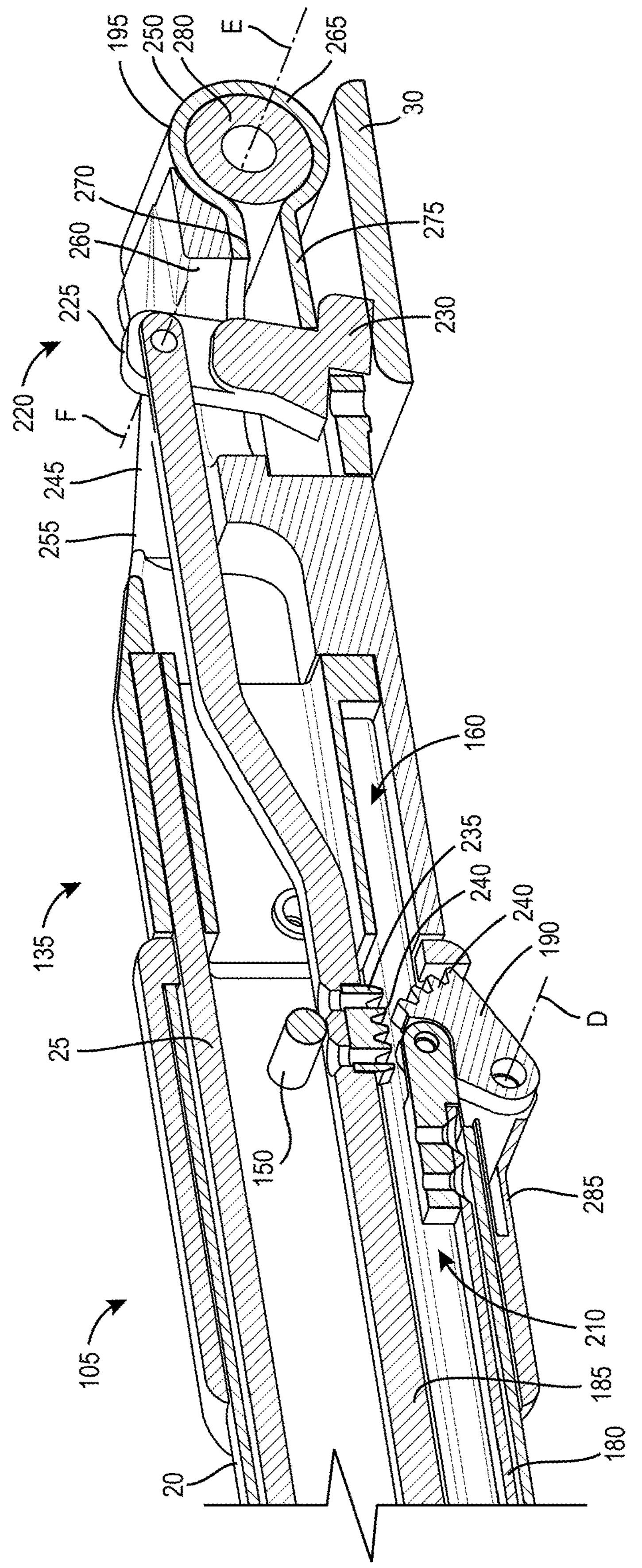
FIG. 7 is an enlarged cross-sectional view of a front end of the handle assembly of FIG. 5.

180 includes a first end 205 that is pivotably coupled to the brake handle 175 about a pivot axis C that is parallel with the pivot axis B and a second end 210 that is coupled to the pawl 190 (FIG. 7). The pull rod 180 extends through the slot 160 of the inner tube 25. In the illustrated embodiment, the pull rod 180 may be a flexible band that stretches when a tensile force is applied to it. In other embodiments, the pull rod 180 may be rigid and non-stretchable.

With continued reference to FIG. 7, the brake rod 185 is positioned within the interior 165 of the inner tube 25. Generally, the brake rod 185 is movable together with the inner tube 25 relative to the outer tube 20. The brake rod 185 includes a first end 215 that is slidably supported by the rear bushing 140 and a second end 220 that is coupled to a brake lever 225, the purpose of which is explained in detail below. The brake lever 225 includes a foot 230 that engages the brake clamp 195 to apply a clamping force to the brake clamp 195.

As shown in FIGS. 5 and 7, the brake rod 185 also includes a plurality of racks 235. Each rack 235 is positioned adjacent an aperture 145 of the inner tube 25. As such, the racks 235 are in discrete locations that corresponds to positions where the inner tube 25 may be fixed to the outer tube 20. The racks 235 include teeth 240 that correlate to teeth 240 on the pawl 190. The pawl 190 is pivotably supported by an adjustment assembly 40 about a pivot axis D. The pawl 190 is pivotable within the slot 160 of the inner tube 25 in a counter-clockwise direction (as viewed from FIG. 7) to engage the racks 235. As such, when disengaged from the racks 235, the pawl 190 does not interfere with the telescoping movement of the inner tube 25 relative to the outer tube 20.

Figure 8:
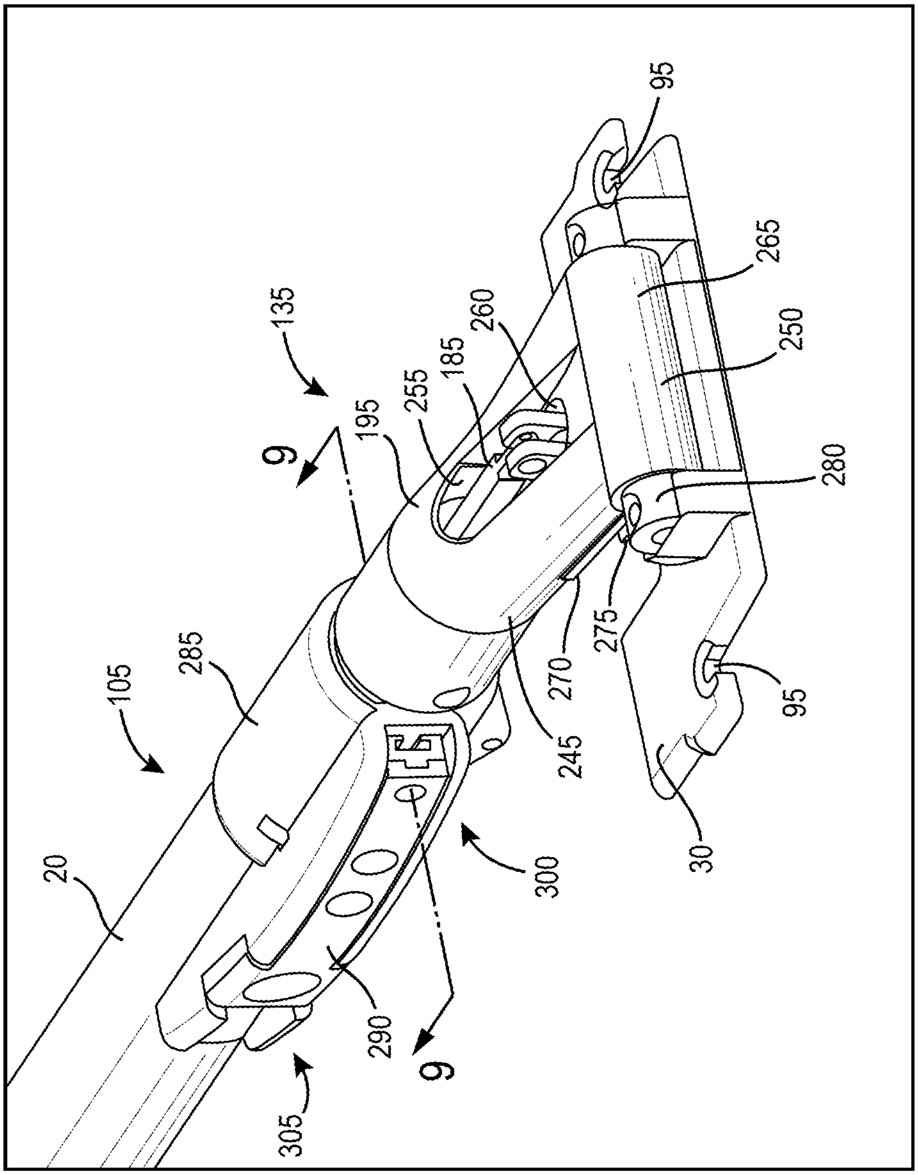
FIG. 8 is a perspective view of a portion of the handle assembly of FIG. 1.

Referring to FIGS. 7 and 8, the brake clamp 195 is coupled to a mount 245 that is coupled to the second end 135 of the inner tube 25. The brake clamp 195 includes a wrap-around portion 265, a first flange 270 coupled to the mount 245, and a second flange 275 opposite the first flange 270. A pivot shaft 280 of the connecting plate 30 is received within the wrap-around portion 265 for rotation relative to the brake clamp 195 about an axis of rotation E (FIG. 7). The mount 245 defines a first opening 255 through which the second end 220 of the brake rod 185 extends and a second opening 260 (FIG. 7) through which the lever 225 extends. In the illustrated embodiment, the mount 245 is made from a high-quality plastic and the brake clamp 195 is made from stainless steel.

As described above, the finisher box 15 applies a drywall compound to joints between pieces of drywall. During a drywall finishing application, a user holds the outer tube 20 with the first end 100 proximate the user's body. The user may then place the finisher box 15 against a joint between pieces of drywall. A user may apply manual pressure to the pressure plate 60 through the connected handle assembly 10, so that the pressure plate 60 is rotated about the pivot axis A and compound is extruded from the aperture 75.

While applying the drywall compound, the pivot shaft 280 of the connecting plate 30 allows the finisher box 15 to rotate relative to the handle assembly 10 about the axis of rotation E to accommodate the contour of a surface or to maintain the finisher box 15 against the drywall while the handle assembly 10 is moved away from the body of a user. However, while transporting the finisher box 15 to a new joint or while filling the finisher box 15 with drywall compound, rotation of the finisher box 15 relative to the handle assembly 10 is undesirable. To prevent the rotation of the finisher box 15 relative to the handle assembly 10, a user may pivot the brake handle 175 about the pivot axis B towards the outer tube 20 (FIG. 6). This pivots the first end 205 of the pull rod 180 about the pivot axis C, moving the pull rod 180 in a direction towards the first end 100 of the outer tube 20. The second end 210 of the pull rod 180 pivots the pawl 190 in a counter-clockwise direction about the pivot axis D to engage one of the racks 235 of the brake rod 185 (FIG. 7). Once the teeth 240 of the pawl 190 engage the teeth 240 of the rack 235, the brake rod 185 is translated rearward in a direction towards the first end 130 of the inner tube 25. As the brake rod 185 is translated rearward, the lever 225 pivots about a pivot axis F in a counter-clockwise direction, causing the foot 230 to move upward from the frame of reference of FIG. 7, drawing the second flange 275 towards the first flange 270. As the first and second flanges 270, 275 get closer, the effective inner diameter of the wrap-around portion 265 decreases, applying a clamping force to the pivot shaft 280 of the connecting plate 30. The clamping force prevents the connecting plate 30, and thus the finisher box 15, from pivoting relative to the handle assembly 10.

With reference to FIGS. 8 and 9, the adjustment assembly 40 is operable to adjust the combined length of the tubes 20, 25 by adjusting the protruding length of the inner tube 25 from the outer tube 20. The assembly 40 includes an adjustment housing 285 positioned on the second end 105 of the outer tube 20, an adjustment lever 290, and a detent 295. The pawl 190 is pivotably supported on the adjustment housing 285 for rotation about the axis D (FIG. 7). The adjustment lever 290 is pivotable relative to the adjustment housing 285 and includes a first end 300 and a second end 305. The detent 295 is coupled to the first end 300 of the adjustment lever 290 and extends into the interior 125 of the outer tube 20. A resilient member (e.g., a compression spring, not shown) is positioned between the adjustment housing 285 and the second end 305 of the adjustment lever 290 to bias the detent 295 into the interior 125 of the outer tube 20. The detent 295 extends into the recess 155 of the insert 150 to fix the inner tube 25 relative to the outer tube 20.

To adjust the length of the handle assembly 10, a user may pivot the adjustment lever 290 towards the adjustment housing 285 against the bias of the resilient member to remove the detent 295 from the recess 155 of the insert 150. Once the detent 295 is removed, the inner tube 25 is allowed to move relative to the outer tube 20. The user may further extend the inner tube 25 from the outer tube 20 to increase the length of the handle assembly 10 or the user may retract the inner tube 25 into the outer tube 20 to decrease the length of the handle assembly 10. While extending or retracting the inner tube 25, a user may continue to support the weight of the handle assembly 10 and the finisher box 15 with both two hands on the outer tube 20. As the inner tube 25 moves, the detent 295 will be biased back into the recess 155 of an adjacent insert 150 to fix the inner tube 25 relative to the outer tube 20. If a user wishes to extend or retract the inner tube 25 further than the adjacent insert 150, a user may continue to hold the adjustment lever 290 against the bias of the resilient member until a desired length of the handle assembly 10 is achieved. By providing the detent recess 155 within the insert 150, which is made from a harder material than the inner tube 25, as opposed to positioning the detent 295 directly within an aperture 145 in the inner tube 25, the useful life of the handle assembly 10 is increased because the risk of marring and elongating the apertures 145 in the inner tube 25 is eliminated. Additionally, the inserts 150 may be easily replaced if damaged by unthreading the insert 150 from the aperture 145 and replacing with a new insert 150.

It is typically recommended that after each drywall finishing job is complete, the handle assembly 10 is cleaned. To clean the handle assembly 10, a user may discharge water through the opening 120 adjacent the first end 100 of the outer tube 20. The water will then pass through both the interior 125 of the outer tube 20 and the interior 165 of the inner tube 25 to collect and carry any residual drywall compound left in the inner and outer tubes 20, 25. The water is then discharged from the first opening 255 in the mount 245. Additionally, the inner tube 25 is removable from the outer tube 20 to separately clean the interiors 125, 165 of the inner tube 25 and outer tube 20, respectively. A user may remove the inner tube 25 from the outer tube 20 by using the adjustment assembly 40 described above. Water can then be discharged through each component separately for cleaning before repositioning the inner tube 25 within the outer tube 20.

By locating the brake handle 175 on the outer (larger diameter) tube 20, a user is provided with a more comfortable grip compared to an embodiment in which the brake handle 175 is located on a smaller diameter, inner tube. Additionally, by locating the brake handle 175 on the outer (larger diameter) tube 20, the center of mass of the handle assembly 10 is shifted closer towards the user, providing the user with more control of the handle assembly 10 while applying drywall compound with an attached finisher box 15. Further, providing the brake handle 175 on the larger diameter outer tube 20 provides a large opening 120 at the rear of the handle assembly 10 through which the user can discharge water for easier cleaning of the handle assembly 10.

FIGS. 10-15 illustrate a handle assembly 310 according to another embodiment of the invention. The handle assembly 310 is like the handle assembly 10 with like features being represented by like reference numerals. As such, only the differences will be described below. The handle assembly 310 includes the outer tube 20, the inner tube 25 received within the outer tube 20, and a connecting plate 312 to which the finisher box 15 can be fastened, thereby unitizing the connecting plate 312 to the finisher box 15.

Figure 10:
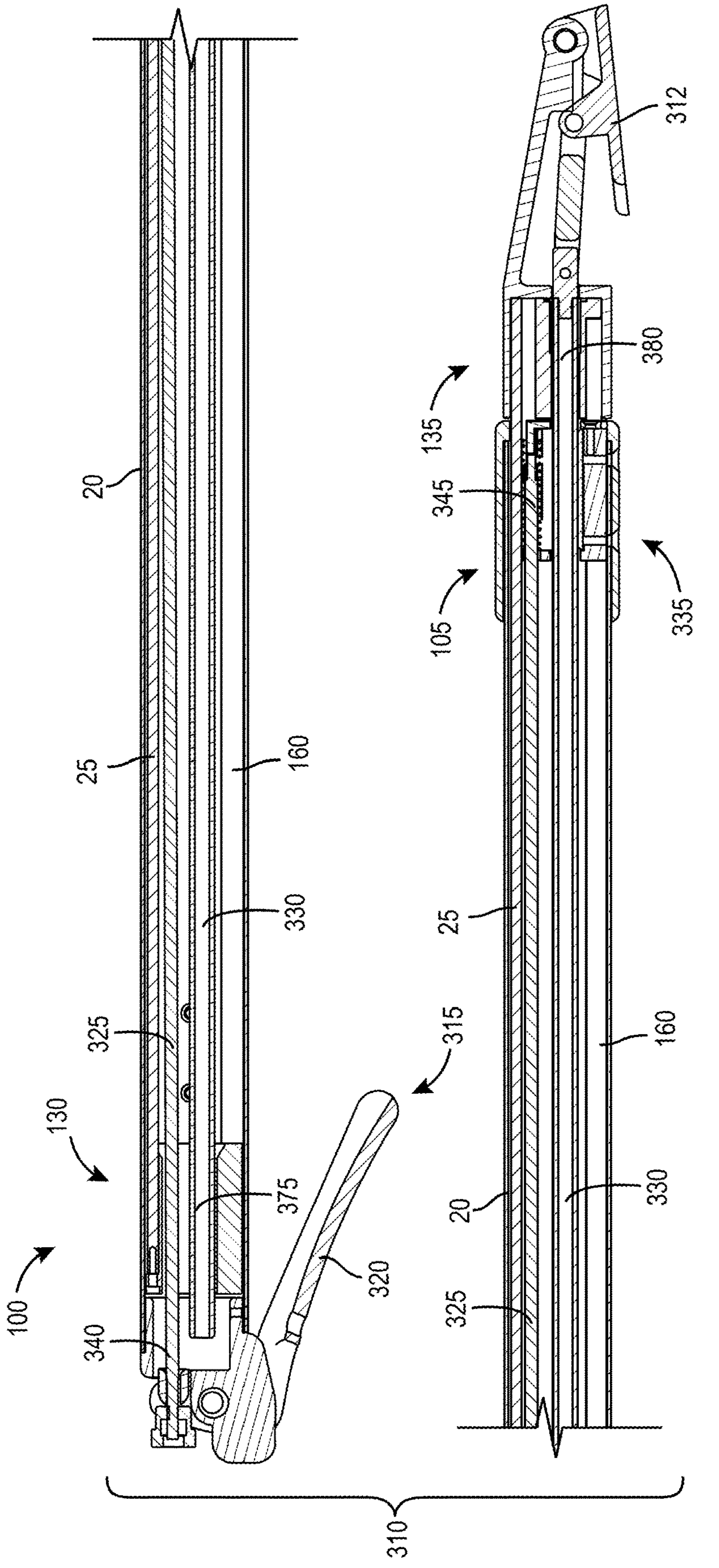
FIG. 10 is a cross-sectional view of a handle assembly according to another embodiment of the invention.
Figure 11:
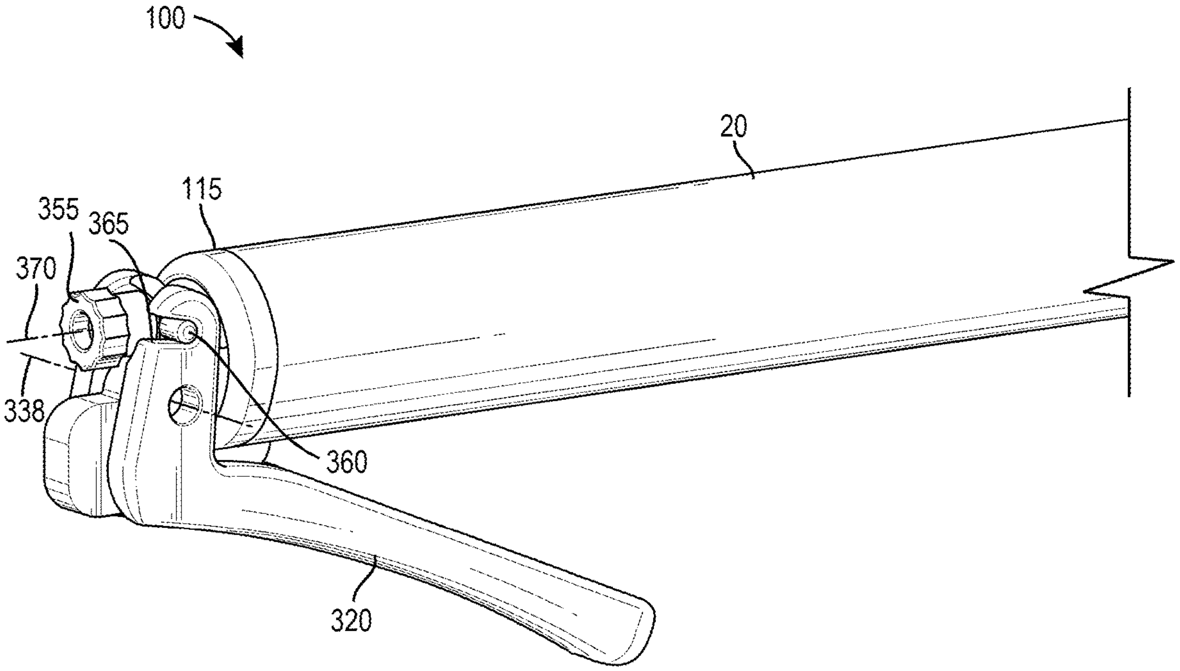
FIG. 11 is an enlarged view of a rear end of the handle assembly of FIG. 10.
Figure 12:
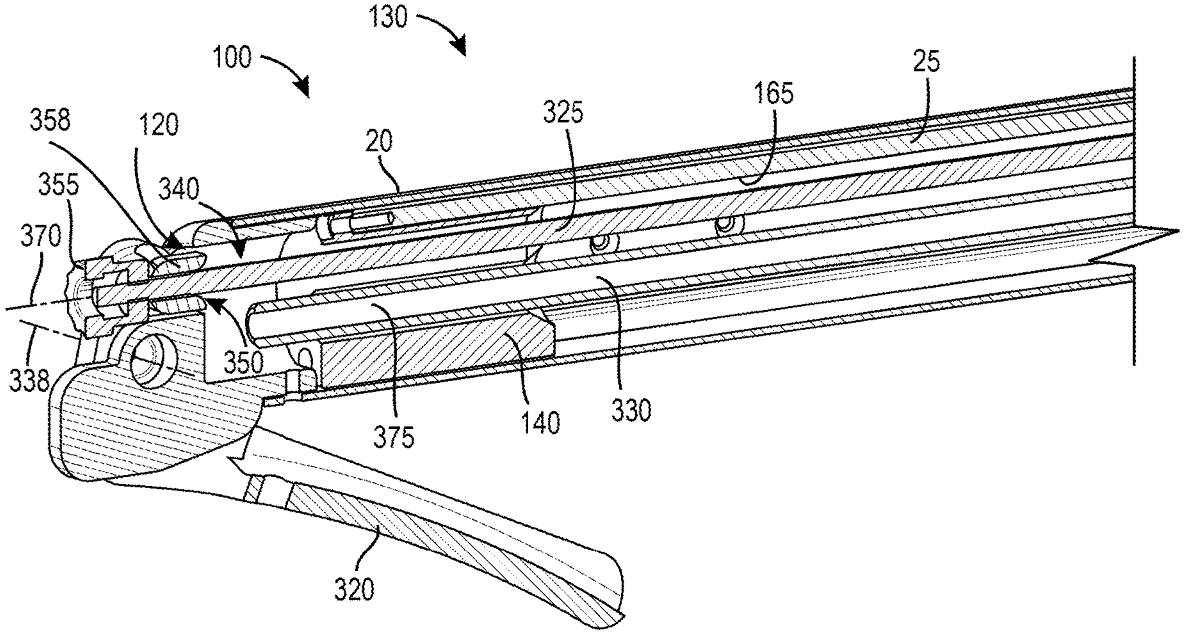
FIG. 12 is an enlarged cross-sectional view of the rear end of the handle assembly of FIG. 10.

With reference to FIG. 10, the handle assembly 310 includes a brake assembly 315 having a brake handle 320, a pull rod 325, a brake rod 330, and a clamp assembly 335. As shown in FIGS. 11 and 12, the brake handle 320 is pivotably coupled to the rear bracket 115 about a pivot axis 338. The pull rod 325 extends through the interior 165 of the inner tube 25 and includes a first end 340 protruding from the opening 120 (FIG. 12) and a second end 345 (FIG. 13) that is coupled to the clamp assembly 335. The first end 340 of the pull rod 325 is threaded. A connector 350 and an adjuster 355 are positioned concentrically about the first end 340 of the pull rod 325. The connector 350 includes a hub 358 having a hole through which the first end 340 of the pull rod 325 is received (FIG. 12) and a cross-pin 360 affixed to the hub 358 that is received within slots 365 in the brake handle 320 on opposite sides of the hub 358 (FIG. 11). The adjuster 355 includes threads that are mated with the corresponding threads on the second end 345 of the pull rod 325. The adjuster 355 is also abutted with the hub 358 of the connector 350. Therefore, the adjuster 355 may be rotated by a user to axially move the connector 350 along the pull rod 325, moving the relative position of cross-pin 360 within the slots 365 to change the position of the brake handle 320 relative to the rear bracket 115. This permits the user to adjust the gap between the brake handle 320 and the tube 20 to account for different hand sizes. In operation of the handle assembly 310, as the brake handle 320 is pivoted about the pivot axis 338, the brake handle 320 pulls the connector 350 and the abutted adjuster 355, and thus the pull rod 325, along a central axis 370 of the pull rod 325 further out of the opening 120.

Figure 13:
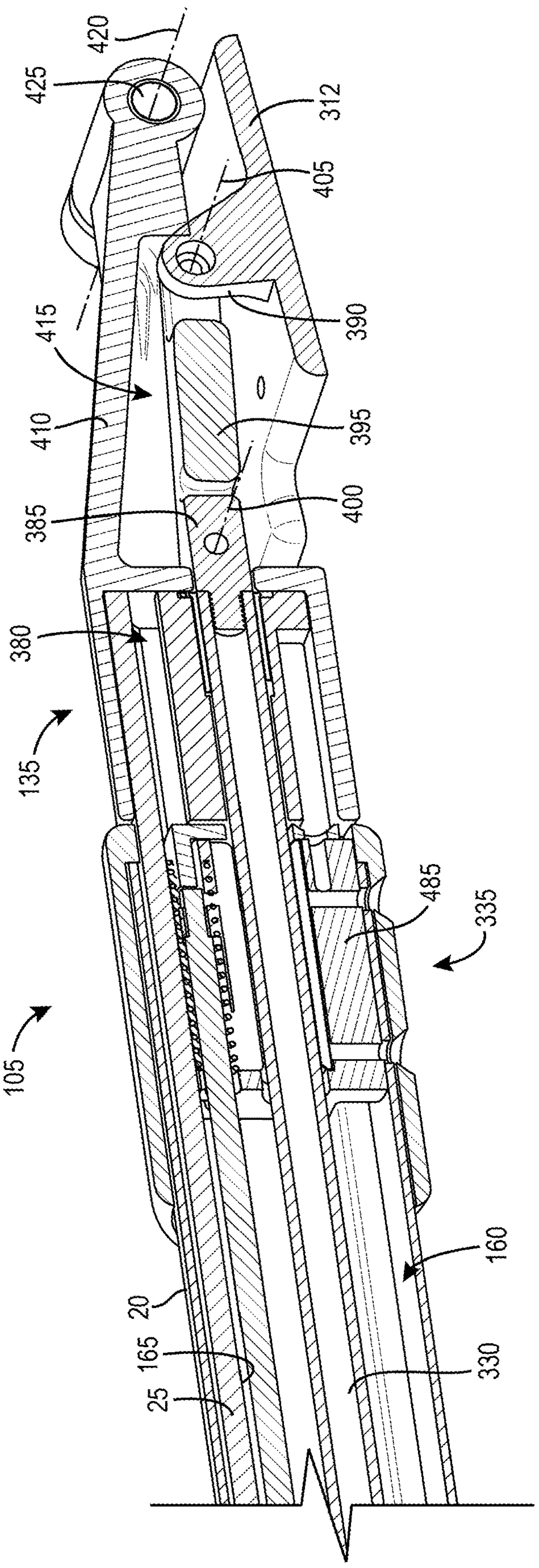
FIG. 13 is an enlarged cross-sectional view of a front end of the handle assembly of FIG. 10.

With reference to FIG. 13, the brake rod 330 also extends through the interior 165 of the inner tube 25 and includes a first end 375 (FIG. 12) that is slidably supported by the rear bushing 140, which moves with the inner tube 25 as it telescopes relative to the outer tube 20, and a second end 380 that extends through the clamp assembly 335 and is coupled to an end cap 385. The end cap 385 is coupled to an arm 390 protruding from the connecting plate 312 through a link 395. The link 395 is pivotable relative to the end cap 385 about an axis 400 and is pivotable relative to the connecting plate 312 through an axis 405. A mount 410 is attached to the second end 135 of the inner tube 25 and pivotably supports the connecting plate 312. The mount 410 includes an opening 415 through which the arm 390 of the connecting plate 312 extends. The connecting plate 312 is pivotable relative to the mount 410 about an axis 420 defined by a pivot shaft 425 supported on the mount 410. In order for the connecting plate 312 to pivot relative to the mount 410, the brake rod 330 must be permitted to freely move relative to the inner tube 25, allowing the link 395 to pivot the connecting plate 312 about the pivot shaft 425.

Figure 14:
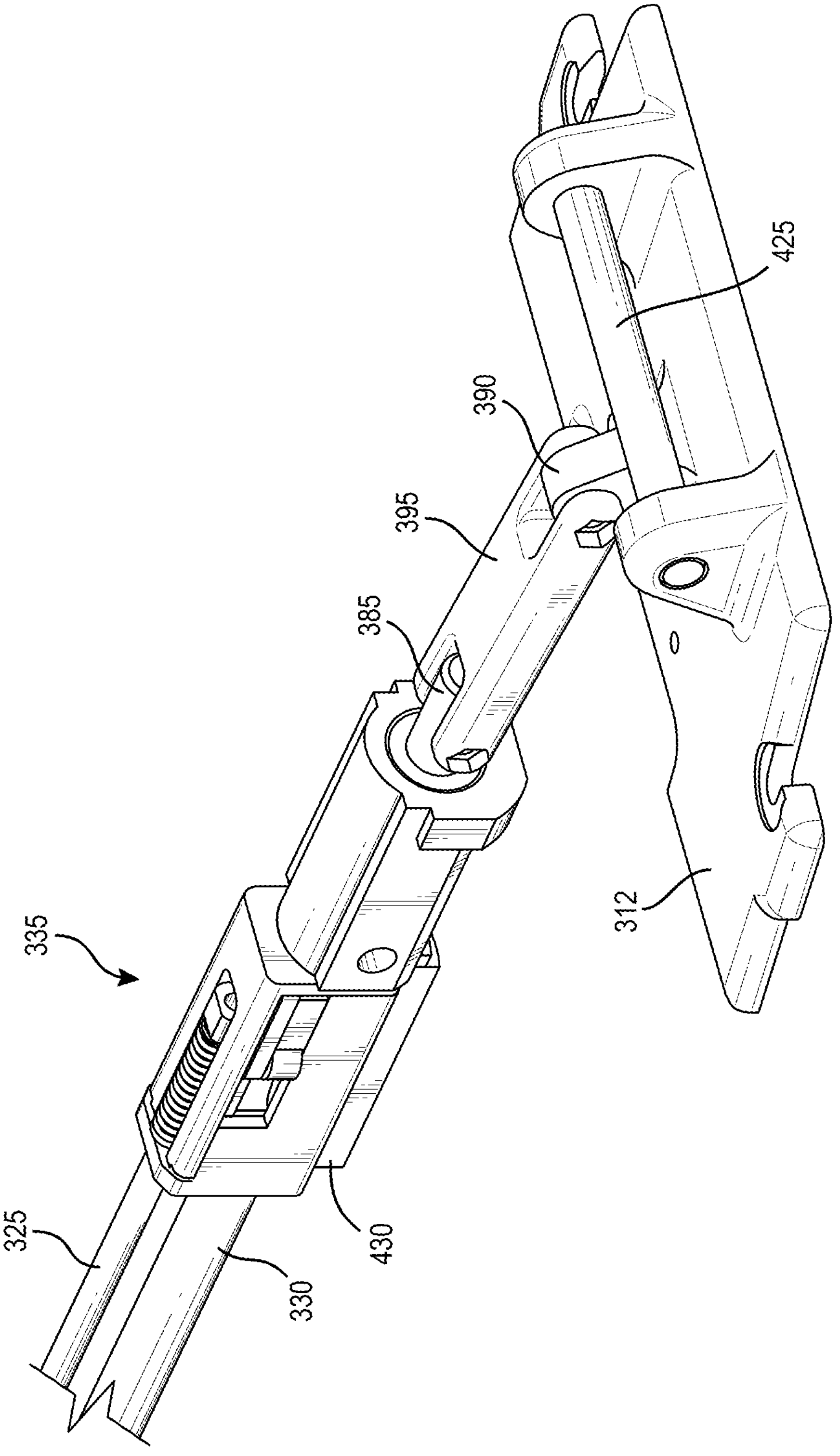
FIG. 14 is a perspective view of the front end of the handle assembly of FIG. 10
Figure 15:
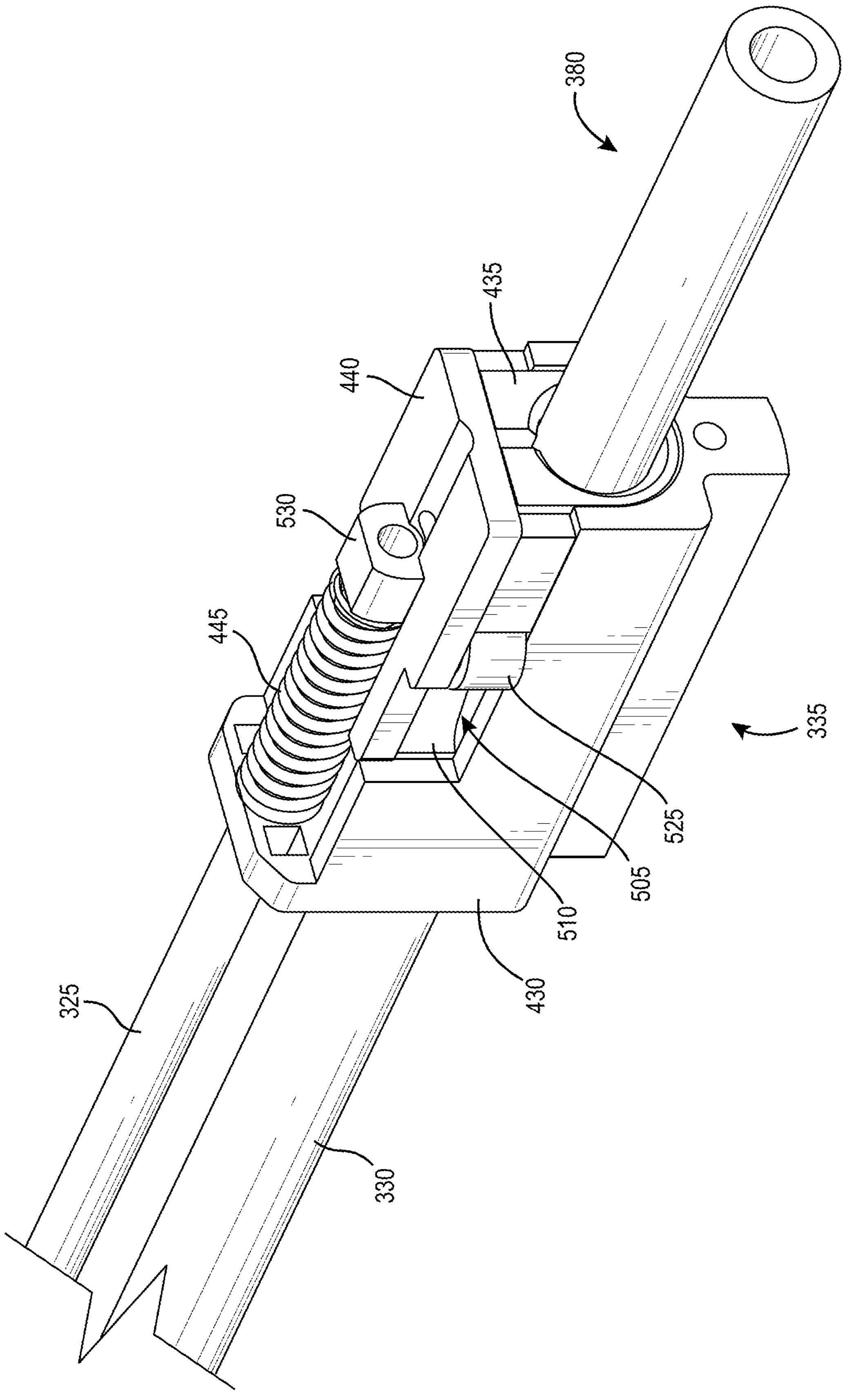
FIG. 15 is a perspective view of a clamp assembly of the handle assembly of FIG. 10.
Figure 16:
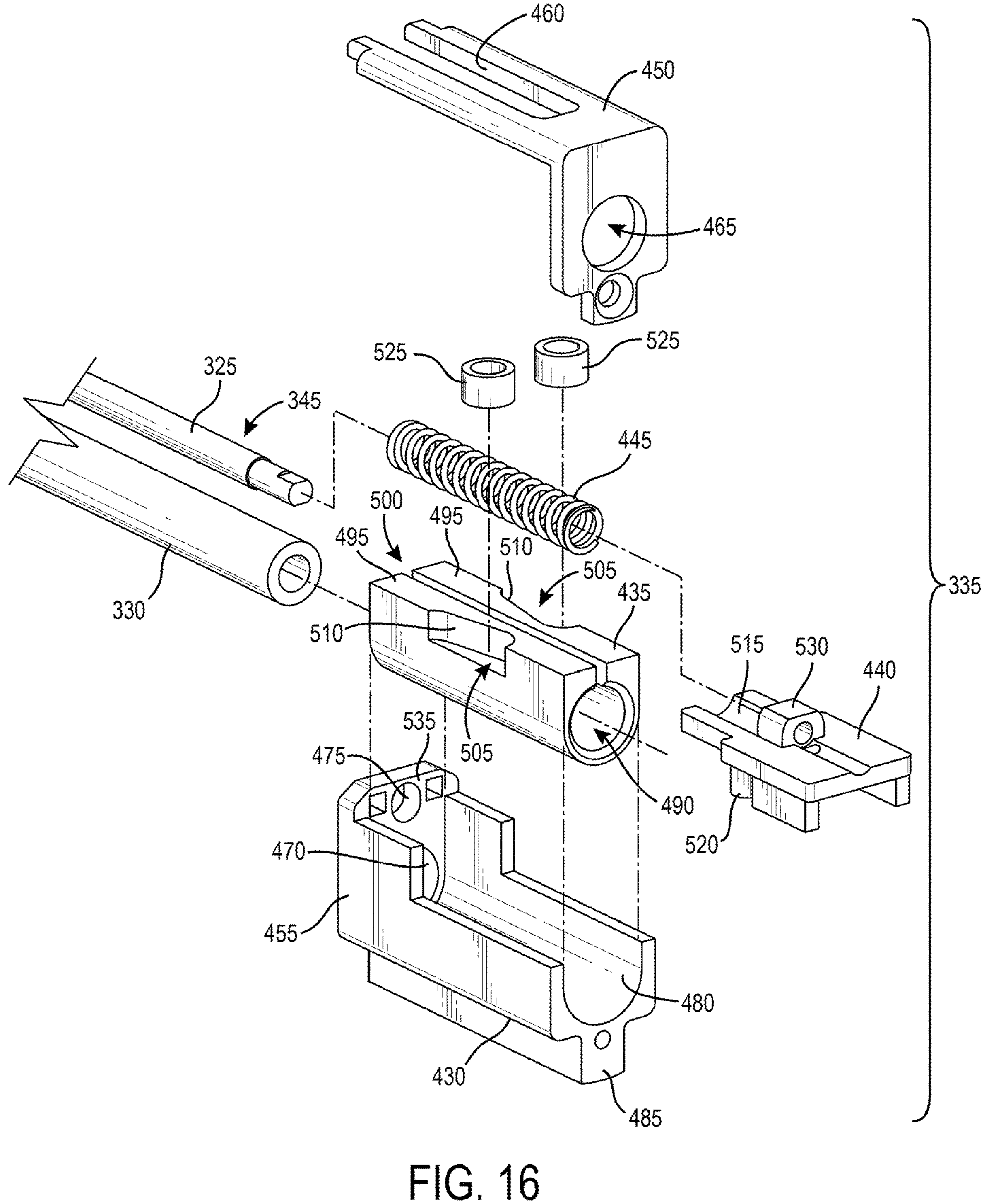
FIG. 16 is an exploded view of the clamp assembly of FIG. 14.

With reference to FIGS. 14-16, the clamp assembly 335 includes a housing 430 that is supported within the interior 165 of the outer tube 20 proximate the second end 105, a clamp 435, a clamp actuator 440, and a resilient member (e.g., a compression spring 445). The housing 430 includes a top portion 450 and a bottom portion 455. The top portion 450 includes a window 460 in which the compression spring 445 is positioned and an opening 465 through which the brake rod 330 extends. The bottom portion 455 includes a first opening 470 through which the brake rod 330 extends, a second opening 475 through which the pull rod 325 extends, a channel 480 that supports the clamp 435, and a rib 485 extending along a bottom surface of the bottom portion 455 that is positioned within the slot 160 of the inner tube 25 (FIG. 13). The rib 485 supports the clamp assembly 335 on an interior surface of the outer tube 20, allowing the inner tube 25 to axially slide relative to the outer tube 20 (and the clamp assembly 335) while avoiding the clamp assembly 335. The clamp 435 includes a central bore 490 through which the brake rod 330 extends and two flanges 495 that are separated by a split 500 that extends into the central bore 490. The flanges 495 are resilient and may be biased towards each other to decrease the size (i.e., width) of the split 500 and therefore, the inner diameter of the central bore 490. Each flange 495 includes a recess 505 that extends towards the split 500. Each recess 495 includes a tapered surface 510 that is tapered towards the first end 375 of the brake rod 330. In other words, the recess 505 decreases in depth closer to the first end 375 of the brake rod 330.

The clamp actuator 440 includes a cradle 515 and two roller axles 520 (although only one is shown in FIG. 16). The cradle 515 supports the second end 345 of the pull rod 325. A roller 525 is positioned around each of the roller axles 520. The rollers 525 are concentric with the roller axles 520 and rotatable about the roller axles 520. When assembled, the rollers 525 are positioned in the recesses 495 of the clamp 435 adjacent the tapered surfaces 510. The compression spring 445 is positioned around the second end 345 of the pull rod 325 within the cradle 515. The compression spring 445 extends between opposed seats, 530, 535 on the bottom portion 455 of the housing 430 and the clamp actuator 440, respectively. The second end 345 of the pull rod 325 is fixed to the seat 530. As such, the compression spring 445 biases the clamp actuator 440 away from the first end 340 of the pull rod 325 to maintain the rollers in contact with a deeper part of the tapered surfaces 510.

Like the handle assembly 10, the connecting rod 425 of the connecting plate 312 allows the finisher box 15 to rotate relative to the handle assembly 310 about the axis 415 to accommodate the contour of a surface or to maintain the finisher box 15 against the drywall while the handle assembly 310 is moved away from the body of a user. However, while transporting the finisher box 15 to a new joint or while filling the finisher box 15 with drywall compound, rotation of the finisher box 15 relative to the handle assembly 10 is undesirable. To prevent the rotation of the finisher box 15 relative to the handle assembly 10, a user may pivot the brake handle 320 about the pivot axis 338 towards the outer tube 20. This translates the first end 340 of the pull rod 325 axially out of the opening 120, which in turn pulls the second end 345 of the pull rod 325 rearward towards the first end 130 of the inner tube 25. Because the second end 345 of the pull rod 325 is fixed to the clamp actuator 440, the clamp actuator 440 is displaced rearward against the bias of the compression spring 445 towards the first end 130 of the inner tube 25. Meanwhile, the rollers 525 progressively roll along the tapered surfaces 510 of the clamp 435 from the deep end of the recesses 505 to the shallow end, applying a clamping force to the flanges 495 to reduce the width of the gap 500, and therefore the inner diameter of the central bore 490. This applies a balanced clamping force to the brake rod 330, preventing axial movement of the brake rod 330. In other words, the side loading applied by the rollers 525 to the respective flanges 495 is balanced, thereby reducing wear on the clamp 435. With the brake rod 330 locked from axial movement, the link 395 is prevented from rotating about the axes 400, 405. As a result, the connecting plate 312 prevents the finisher box 15 from pivoting about the axis 420 relative to the handle assembly 310.

Although the invention has been described in detail with reference to certain embodiments above, variations and modifications exist within the scope and spirit of one or more independent aspects of the invention as described.

Various features and advantages of the invention are set forth in the following claims.

What is claimed is:

1. A handle assembly for a finisher box, the handle assembly comprising:

- a first tube including a first end and a second end opposite the first end, the first tube defining a longitudinal axis extending between the first and second ends;
- a second tube disposed within the first tube, the second tube movable relative to the first tube along the longitudinal axis, the first tube including a first end and a second end opposite the first end;
- a connecting plate pivotably supported by the second end of the second tube, the connecting plate configured to be coupled to the finisher box to support the finisher box from the handle assembly; and
- a brake assembly including a brake handle coupled to the first end of the first tube, the brake assembly configured to selectively inhibit pivoting movement of the connecting plate,
- wherein the second tube defines a slot that extends between the first and second ends of the second tube along the longitudinal axis;
- wherein the brake assembly is at least partially disposed within the slot.

2. The handle assembly of claim 1, wherein the second tube is slidable relative to the first tube to adjust a combined length of the first and second tubes.

3. The handle assembly of claim 2, further comprising an adjustment assembly configured to adjust the combined length of the first and second tubes.

4. The handle assembly of claim 3, wherein the adjustment assembly includes a detent carried by one of the outer tube and the inner tube, wherein the other of the outer tube and the inner tube defines a plurality of recesses along the length thereof, and wherein the detent is positionable within any of the recesses to determine the combined length of the first and second tubes.

5. The handle assembly of claim 4, wherein a recess of the plurality of recesses is defined by an insert fixed to the inner tube, and wherein the insert is made from a first material having a higher hardness than a second material from which the inner tube is made.

6. The handle assembly of claim 1, wherein a cross-sectional profile of the first tube is generally oval-shaped and includes a height dimension that is greater than a width dimension of the first tube.

7. The handle assembly of claim 1, wherein the second tube includes a generally C-shaped cross-sectional profile.

8. The handle assembly of claim 1, wherein the first and second tubes are made from Aluminum.

9. The handle assembly of claim 1, wherein the brake assembly is at least partially disposed within an interior of the second tube.

10. The handle assembly of claim 1, wherein the brake assembly further comprises a brake clamp supported by the second end of the second tube.

11. The handle assembly of claim 10, wherein the brake clamp is positioned about a pivot shaft of the connecting plate, and wherein the brake clamp is configured to apply a clamping force to the pivot shaft.

12. The handle assembly of claim 11, wherein the brake assembly further includes

- a pull rod having a first end coupled to the brake handle, and
- a brake rod operable to apply the clamping force to the brake clamp.

13. The handle assembly of claim 12, wherein the pull rod includes a second end opposite the first end, the second end coupled to a pawl with teeth, wherein the brake rod includes a rack with teeth, and wherein in response to actuation of the brake handle the teeth of the pawl mate with the teeth of the rack to axially move the brake rod along the longitudinal axis to apply the clamping force to the brake clamp.

14. The handle assembly of claim 13, wherein the brake rod is movable with the second tube as the second tube is slidable relative to the first tube to adjust a combined length of the first and second tubes.

15. The handle assembly of claim 14, wherein the rack on the brake rod is one of a plurality of racks along the length of the brake rod, and wherein the pawl is engageable with one of the plurality of racks on the brake rod in a corresponding plurality of combined lengths to which the first and second tubes are adjustable.

16. The handle assembly of claim 13, wherein the brake assembly further includes a brake lever pivotably coupled to an end of the brake rod proximate the second end of the second tube, and wherein the brake lever includes a foot engageable with the brake clamp to apply the clamping force to the brake plate.

17. The handle assembly of claim 12, wherein the pull rod is a flexible band.

18. The handle assembly of claim 1, wherein the brake assembly further comprises a clamp assembly adjacent the second end of the second tube, a brake rod having a first end and a second end opposite the first end extending through the clamp assembly, and a pull rod having a first end coupled to the brake handle and a second end opposite the first end coupled to the clamp assembly.

19. The handle assembly of claim 18, wherein the clamp assembly is disposed within an interior of the second tube.

20. The handle assembly of claim 18, wherein the second tube includes a longitudinal slot extending between the first and second ends of the second tube, and wherein the clamp assembly includes a rib positioned in the slot.

21. The handle assembly of claim 18, wherein the clamp assembly includes a clamp positioned about the brake rod and a clamp actuator coupled to the pull rod.

22. The handle assembly of claim 21, wherein the clamp actuator is biased toward the second end of the second tube by a resilient member.

23. The handle assembly of claim 21, wherein in response to actuation of the brake handle, the clamp applies a clamping force to the brake rod to inhibit axial movement of the brake rod.

24. The handle assembly of claim 23, wherein the clamp includes a central bore through which the brake rod extends and two flanges that are separated by a split that extends into the central bore, and wherein in response to actuation of the brake handle, the clamp actuator axially moves relative to the clamp to apply a force to each of the flanges, thereby closing the split and applying the clamping force to the brake rod.

25. The handle assembly of claim 24, wherein the clamp assembly further includes first and second rollers rotatably supported upon the clamp actuator, and wherein the first and second rollers are configured to roll along tapered surfaces of the respective flanges in response to axial movement of the clamp actuator relative to the clamp to close the split.

26. The handle assembly of claim 24, wherein an end of the brake rod protruding from the clamp is pivotably coupled to the connecting plate, and wherein in response to actuation of the brake handle, axial movement of the brake rod, and therefore pivoting movement of the connecting plate, is inhibited.

27. A handle assembly for a finisher box, the handle assembly comprising:

a first tube including a first end and a second end opposite the first end, the first tube defining a longitudinal axis extending between the first and second ends;

a second tube disposed within the first tube, the second tube movable relative to the first tube along the longitudinal axis, the first tube including a first end and a second end opposite the first end;

a connecting plate pivotably supported by the second end of the second tube, the connecting plate configured to be coupled to the finisher box to support the finisher box from the handle assembly;

a brake assembly including a brake handle coupled to the first end of the first tube, the brake assembly configured to selectively inhibit pivoting movement of the connecting plate; and an adjustment assembly configured to adjust the combined length of the first and second tubes, wherein the second tube is slidable relative to the first tube to adjust a combined length of the first and second tubes, wherein the adjustment assembly includes a detent carried by one of the outer tube and the inner tube, wherein the other of the outer tube and the inner tube defines a plurality of recesses along the length thereof, and wherein the detent is positionable within any of the recesses to determine the combined length of the first and second tubes, and wherein a recess of the plurality of recesses is defined by an insert fixed to the inner tube, and wherein the insert is made from a first material having a higher hardness than a second material from which the inner tube is made.

28. A handle assembly for a finisher box, the handle assembly comprising:

a first tube including a first end and a second end opposite the first end, the first tube defining a longitudinal axis extending between the first and second ends;

a second tube disposed within the first tube, the second tube movable relative to the first tube along the longitudinal axis, the first tube including a first end and a second end opposite the first end;

a connecting plate pivotably supported by the second end of the second tube, the connecting plate configured to be coupled to the finisher box to support the finisher box from the handle assembly; and a brake assembly including a brake handle coupled to the first end of the first tube, the brake assembly configured to selectively inhibit pivoting movement of the connecting plate, wherein the brake assembly further comprises a clamp assembly adjacent the second end of the second tube, a brake rod having a first end and a second end opposite the first end extending through the clamp assembly, and a pull rod having a first end coupled to the brake handle and a second end opposite the first end coupled to the clamp assembly, and wherein the second tube includes a longitudinal slot extending between the first and second ends of the second tube, and wherein the clamp assembly includes a rib positioned in the slot.

* * * * *